United States Patent [19]
von Flotow et al.

[11] Patent Number: 5,695,027
[45] Date of Patent: Dec. 9, 1997

[54] ADAPTIVELY TUNED VIBRATION ABSORBER

[75] Inventors: Andreas H. von Flotow; Timothy S. Mixon, both of Hood River, Oreg.

[73] Assignee: Applied Power Inc., Butler, Wis.

[21] Appl. No.: 559,520

[22] Filed: Nov. 15, 1995

[51] Int. Cl.$^6$ .................... F16F 7/10; B64C 27/00
[52] U.S. Cl. .................. 188/380; 244/17.27; 244/75 A; 248/550
[58] Field of Search .................. 188/378–380, 188/267, 299; 280/707; 267/136, 137; 244/17.27, 75 A; 318/348, 349, 611, 623; 248/550, 636

[56] References Cited

U.S. PATENT DOCUMENTS

| Re. 33,937 | 5/1992 | Schubert | 276/136 |
|---|---|---|---|
| 4,473,906 | 9/1984 | Warnaka et al. | 381/71 |
| 4,562,589 | 12/1985 | Warnaka et al. | 381/71 |
| 4,724,923 | 2/1988 | Waterman | 181/208 |
| 4,821,205 | 4/1989 | Schutten et al. | 364/508 |
| 4,878,188 | 10/1989 | Ziegler | 364/724.01 |
| 4,935,651 | 6/1990 | Hong et al. | 310/51 |
| 4,969,632 | 11/1990 | Hodgson et al. | 267/140 |
| 5,000,415 | 3/1991 | Sandercock | 248/550 |
| 5,174,552 | 12/1992 | Hodgson et al. | 267/140.11 |
| 5,182,887 | 2/1993 | Uno et al. | 52/167 R |
| 5,255,764 | 10/1993 | Kurabayashi et al. | 188/380 |
| 5,332,061 | 7/1994 | Majeed et al. | 180/312 |
| 5,456,341 | 10/1995 | Garnjost et al. | 188/378 |
| 5,564,537 | 10/1996 | Shoureshi | 188/380 |

FOREIGN PATENT DOCUMENTS

| 509 911 | 10/1992 | European Pat. Off. | F16F 15/03 |
|---|---|---|---|
| 556 033 | 8/1993 | European Pat. Off. | E04B 1/98 |
| 579 182 | 1/1994 | European Pat. Off. | B62D 33/06 |
| 61-182112 | 1/1987 | Japan | G05D 3/00 |
| 61-286634 | 5/1987 | Japan | F16F 15/02 |
| 63-092851 | 9/1988 | Japan | F16F 15/02 |
| 2 222 657 | 3/1990 | United Kingdom | F16F 15/02 |
| 2 189 573 | 5/1990 | United Kingdom | |
| 2 277 360 | 10/1994 | United Kingdom | F16F 15/02 |
| WO 92/15088 | 9/1992 | WIPO | |

OTHER PUBLICATIONS

Blaszkkeiwicz et al., Tunable Transducers as Smart Materials, 1991 IEEE paper 91CH2817–5/91/0000–0899601.

Kienholz et al., Demonstration of Solar Array Vibration Suppression, North American Conference on Smart Structures and Materials Feb. 13–18 1994.

Hollkamp et al., A Self–Tuning Piezoelectric Vibration Absorber, 35th AIAA/ASME/AHS/ACS Structural Dynamic and Materials Conference Adaptive Structures Forum Apr. 18–22, 1994.

von Flotow et al., Adaptive Tuned Vibration Absorbers: Tuning Laws Tracking agility, Sizing, and Physical Implementations, Noise–Con 94, May 01–04, 1994.

*Primary Examiner*—Robert J. Oberleitner
*Assistant Examiner*—Chris Schwartz
*Attorney, Agent, or Firm*—Quarles & Brady

[57] ABSTRACT

An apparatus for absorbing vibrations in a structural member, such as in an aircraft fuselage, has first and second plates for attaching to the structural member. A mass, which is suspended between the plates, includes a first block connected to the first plate by a first spring and a second block connected to the second plate by a second spring. The springs may be formed by metal straps which allow the mass to move along one axis or by rods which allow two axis movement of the mass. One sensor produces a signal indicating vibration of the structural member and another sensor produces a signal indicating vibration of the mass. A mechanism connected to the first and second block responds to a control signal by varying a distance between the first and second block to alter stiffness of the first and second springs. A control circuit receives the signals from the sensors and produces the control signal which causes the mechanism to alter the spring stiffness so that the spring and the mass resonate to absorb vibration of the structural member.

19 Claims, 5 Drawing Sheets

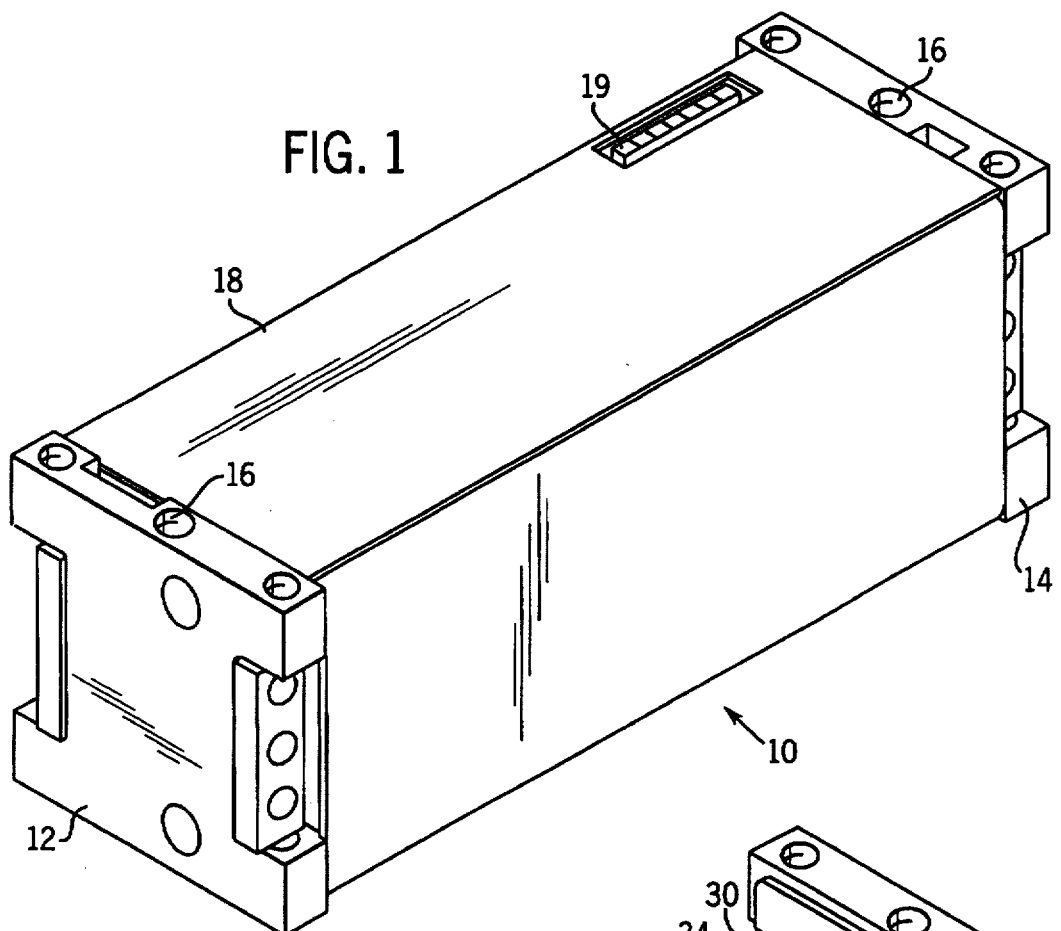
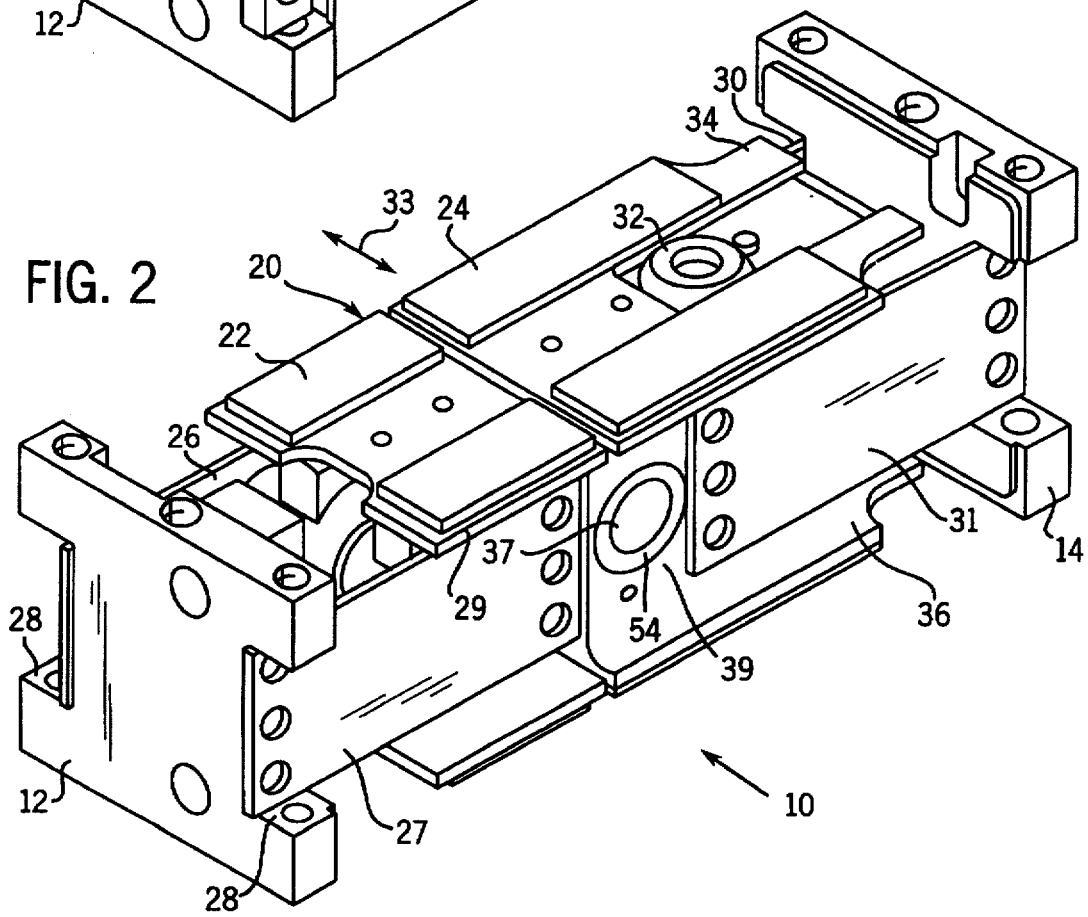

5,695,027

1

ADAPTIVELY TUNED VIBRATION ABSORBER

BACKGROUND OF THE INVENTION

The present invention relates to devices for countering vibration in structural members, such as those of an aircraft fuselage; and particularly to such devices which can be dynamically tuned to adapt performance to changes in vibration frequency.

Aircraft engines can induce significant vibration into the fuselage. In propeller powered planes, the propeller blades produce air pressure pulses which strike external surfaces thereby causing a time periodic vibration of the structure, at about 100 Hz for example, which vibration is transferred to other structural members of the airframe. Jet engines also produce vibration in supporting members. If left unchecked, the induced vibrations create objectionable noise in the aircraft cabin, and may result in serious fatigue of the airframe.

As a consequence vibration absorbers are attached to structural members throughout the aircraft. For example, the Fokker 50 turbo prop airplane carries 150 frame-mounted absorbers. These devices typically are a simple spring-mass system in which a mass is attached to the airframe by a resilient member that acts as a spring. Elastomeric pads and metal cantilevers have been employed as the spring. The spring-mass system is fixedly tuned to resonate at the frequency of common vibration in the structural member of the airframe to which the absorber is attached and thus optimally absorbs the vibration energy at that frequency. The absorber has a large mechanical impedance at resonance which is due mostly to a large quality factor Q. Absorption (mechanical impedance) at other frequencies diminishes as a function of the deviation from the resonant frequency.

One drawback of fixedly tuned absorbers is that the frequency of airframe vibration varies with engine speed, especially in the case of jet engines. Although the absorber may be tuned to the vibration frequency which occurs at the nominal cruising speed of the aircraft, less that optimal vibration absorption occurs at other speeds. In addition, the tuning of elastomeric type absorbers changes with the age of the elastomeric material, and both elastomeric and metal-type absorbers change their tuning with changes in temperature.

Therefore, it is desirable to provide an absorption system which is dynamically adaptive to variation of the vibration frequency.

SUMMARY OF THE INVENTION

An object of the present invention is to provide a system for absorbing time periodic vibrations in structural members wherein the system is autonomously capable of adapting to different vibration frequencies.

This objective is fulfilled by a vibration absorber that has a base for attaching to a structural member. A mass is coupled to the bases by a spring which in the preferred embodiments may be one or a plurality of straps or rods. A mechanism adjusts stiffness of the spring in response to a control signal. Specifically, the mechanism changes the tension or compression force acting on the spring. In the preferred embodiment, the mass is suspended between two end plates by a pair of flexure type springs and the mechanism varies the length of the mass which alters the longitudinal force acting of the springs. This alters the lateral stiffness of the springs.

2

A vibration sensor produces a signal indicating the effectiveness of the vibration absorption. A control circuit receives the signal from the sensor and responds by producing the control signal which causes the mechanism to adjust the spring stiffness so that the spring and mass are tuned to resonate in a manner that absorbs vibration of the structural member.

BRIEF DESCRIPTION OF THE DRAWINGS

FIG. 1 is an isometric view of an enclosed vibration absorber according to the present invention;

FIG. 2 is an isometric view of the vibration absorber with a cover removed;

DETAILED DESCRIPTION OF THE INVENTION

Figure 3:
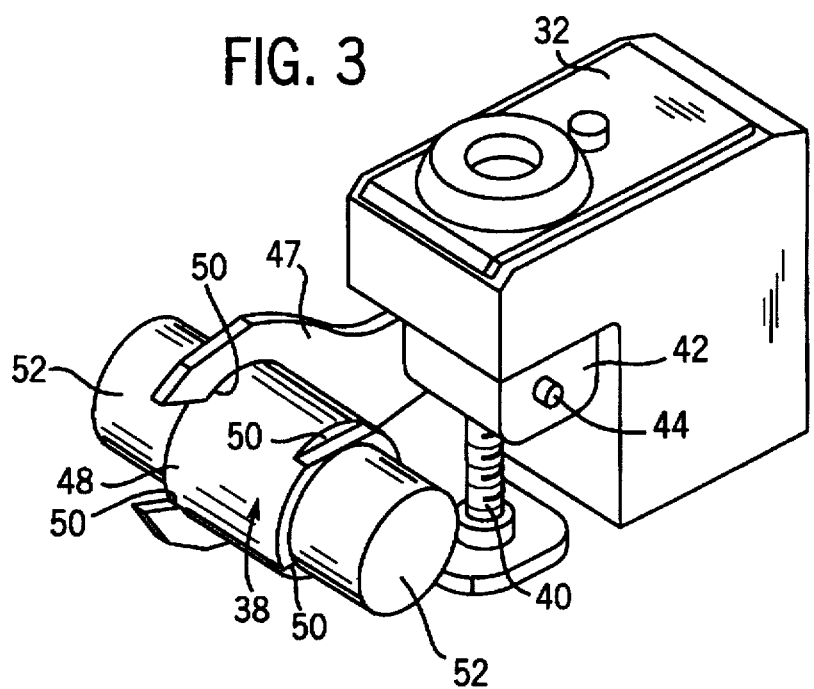
FIG. 3 is an isometric view of the motor and mechanical linkage employed to adjust the tuning of the vibration absorber.

With initial reference to FIG. 1, a vibration absorber 10 has a pair of spaced apart, I-shaped end plates 12 and 14 which form a mount for attaching the vibration absorber 10 to a structural member, such as an aircraft fuselage, carrying the objectionable vibrations. Specifically, each end plate has a central vertical aperture 16 there through for receiving a bolt that engages the vibrating structural member. The vibration absorber reduces the vibration in the attached structural member. Once fastened to the structural member the spacing between the end plates 12 and 14 is held constant. A four sided tubular cover 18 extends between the inner surfaces of the two end plates 12 and 14. The cover 18 forms an enclosure and holds the end plates apart so that tension can be applied to internal components, as will be described. An aperture through the cover 18 provides access to an electrical connector 19.

With reference to FIG. 2 which shows the cover 18 removed, a proof-mass 20, comprising a slider block 22 and a driver block 24, is suspended between the two end plates 12 and 14. The slider block 22 is coupled to the first end plate 12 by a first pair of flexible metal straps 26 and 27 which are parallel to each other. Each metal strap 26 and 27 rests within separate side notches 28 in the I-shaped first end plate 12 and is bolted thereto. The opposite end of the two metal straps 26 and 27 are bolted to the slider block 22. Similarly, one end of each of a second pair of flexible metal straps 30 and 31 is bolted to the driver block 24, while opposite ends are bolted into side notches of the I-shaped second end plate 14 so that straps 30 and 31 are parallel to each other. The metal straps 26, 27, 30 and 31 act as springs, or flexures, which couple the components of the proof-mass 20 to the end plates 12 and 14 in a flexible manner. Because the straps lie in parallel planes the proof-mass can oscillate transversely between the end plates along axis 33. The spring and proof-mass assembly has a resonant frequency which is a function of the mass of the proof-mass 20 and stiffness of the springs formed by the straps 26, 27, 30 and 31. The vibration absorber is mounted to the airframe so that axis 33 coincides with the axis of vibration to be absorbed. When the resonant frequency matches the frequency of the vibration, the vibration energy is absorbed by the proof-mass oscillation. Three vibration absorbers can be mounted along orthogonal axes to provide three dimensional vibration absorption.

The driver block 24 supports a motor assembly 32 which is captivated between an upper plate 34 and a lower plate 36 of the driver block. The driver block has sidewalls 39 with aligned apertures 27 extending therethrough within which is received the ends of a camshaft 38 that is operated by the motor assembly.

Figure 4:
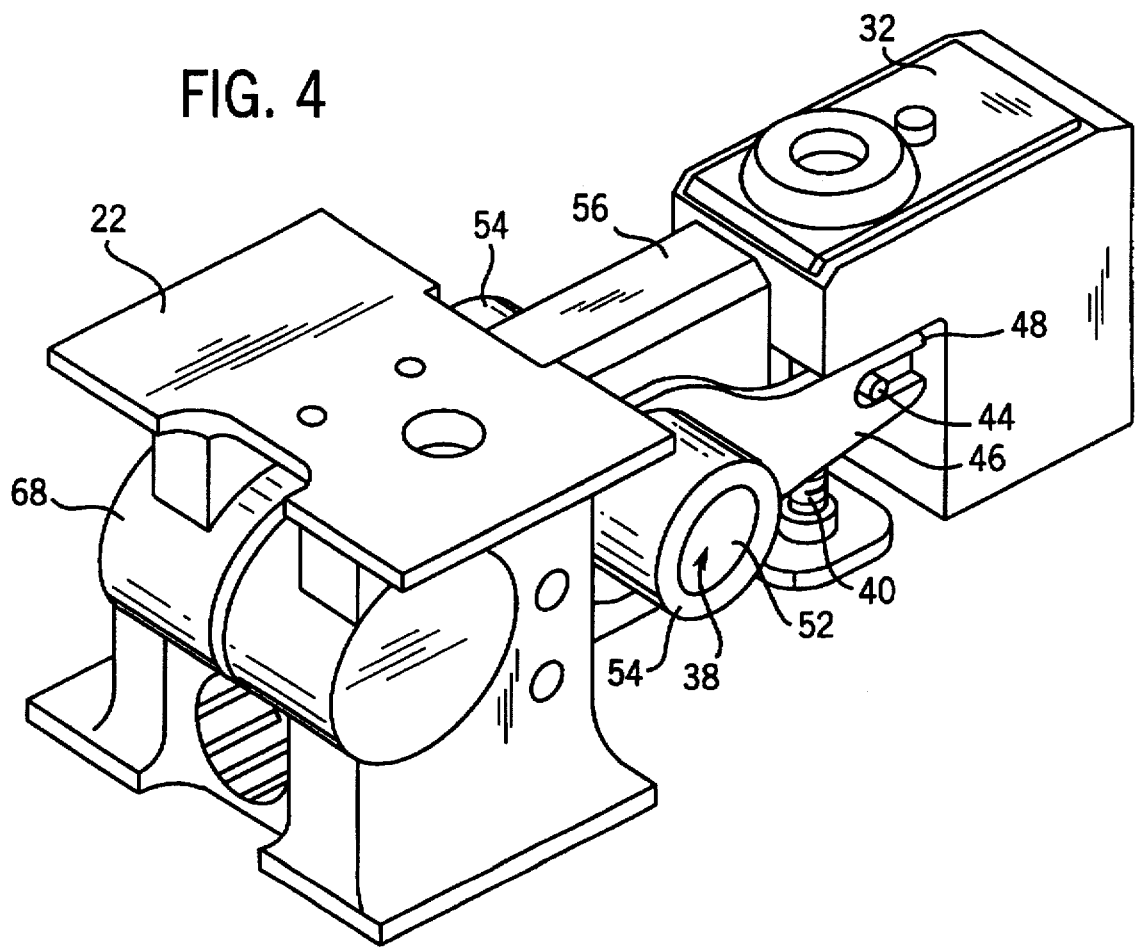
FIG. 4 is a subassembly of the vibration absorber shown in FIG. 2.

With reference to FIG. 3, the motor assembly 32 includes a stepper motor driving a geared transmission and may be a FPS 3002 model manufactured by Futaba Corporation of America, Irvine, Calif. USA. Alternatively, a DC motor may be employed. The output of the transmission is coupled to a threaded lead screw 40. A transfer block 42 has a vertical threaded aperture, through which the lead screw 40 extends, and a pair of pins 44 projecting from opposite sides, with only one of the pins 44 being visible in the drawings. With additional reference to FIG. 4, a pair of wrenches 46 and 47 couple the transfer block 42 to camshaft 38. Each wrench 46 has a U-shaped notch 48 at one end within which is received one of the pins 44 on the transfer block 42. The opposite end of each wrench 46 has a larger U-shaped jaw which extends around the camshaft 38.

The camshaft 38 has a cylindrical center section 48 with a pair of flat notches 50 at each end for receiving flat edge surfaces on the jaws of wrenches 46 and 47, as shown in FIG. 3. The wrench jaws are sized to firmly grip the notches 50 in the camshaft 38 so that movement of the wrenches due to the motor assembly 32 produces rotation of the camshaft. Smaller diameter shafts 52 extend from opposite ends of the camshaft center section 48 along a common axis which is off-center with respect to the axis of the cylindrical center section. In other words, the center section 48 of the camshaft is not concentric with respect to the end shafts 52.

Each end shaft 52 fits within a separate bearing 54 (see FIG. 4) located within an aperture in the sidewall 39 of the driver block 24 (see FIG. 2) thereby enabling the camshaft to rotate freely. As shown specifically in FIG. 4, the center section 48 of camshaft 38 extends through another bearing in an aperture of arm 56 which projects from the main body of the slider block 22 toward the motor assembly 32.

The motor in assembly 32 is bi-directional having a direction of rotation determined by electrical signals applied to connector 19. Depending upon that direction of rotation, the lead screw 40 raises or lowers the transfer block 42 in the illustrated orientation of the vibration absorber 10. Since the wrenches 46 and 47 are coupled to the transfer block 42 by pins 44, the raising and lowering action produces rotation of the camshaft 38 within the apertures of the slider and driver blocks 22 and 24. Due to the eccentricity of the central camshaft section 48 with respect to the end shafts 52, rotation of the camshaft 38 causes the slider block 22 to move toward or away from the driver block 24. However, because the four flexible metal straps 26, 27, 30, and 31 connect the slider block 22 and the driver block 24 to opposite end plates 12 and 14 which are rigidly secured to the aircraft, rotation of the camshaft 38 alters the tension on those metal straps. Thus, the tension on metal straps 26, 27, 30, and 31 can be increased or decreased by operating motor assembly 32. The cover 18, holding the end plates apart (FIG. 1), maintains a preload tension on the metal straps. Alteration of the strap tension changes stiffness of the spring in the mass-spring structure and thus the resonant frequency of the vibration absorber 10. This enables the absorber 10 to be tuned dynamically to different vibration frequencies of the aircraft structure.

Figure 5:
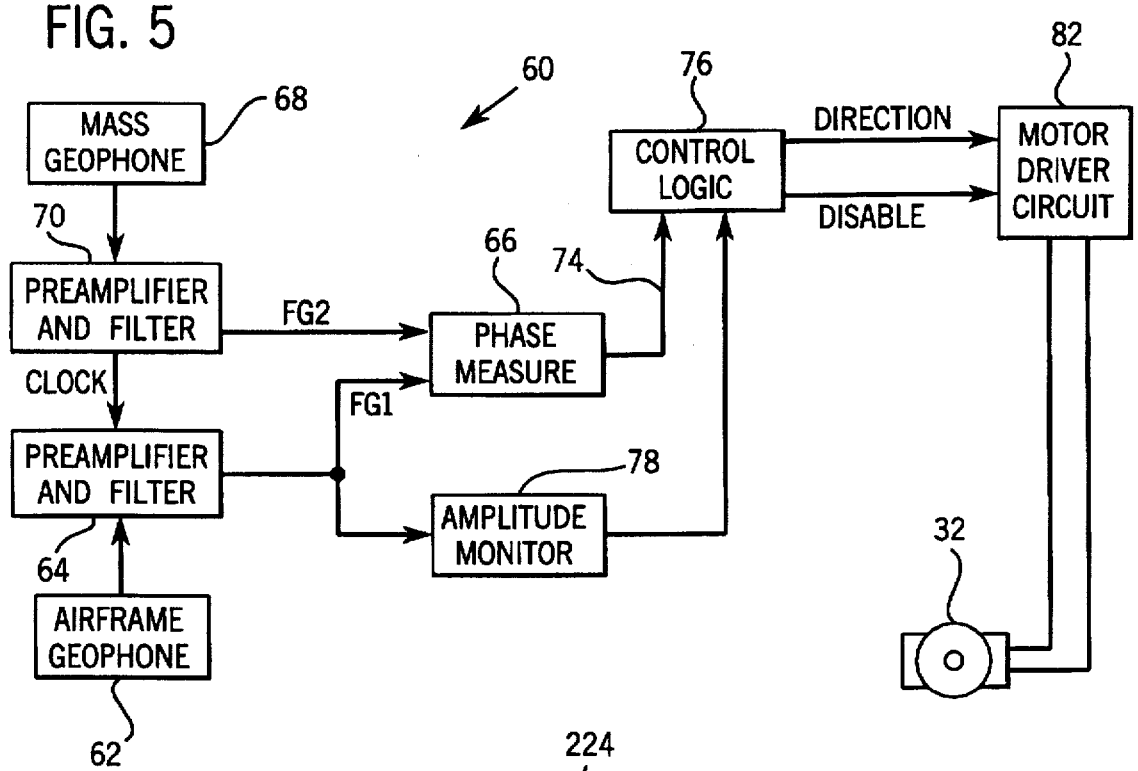
FIG. 5 is a block schematic diagram of a control circuit for sensing airframe vibrations and adjusting the resonant frequency of the vibration absorber.

With reference to FIG. 5, the spring stiffness for the vibration absorber 10 is varied by a control circuit 60 in response to the sensed structural vibrations in the airframe. An airframe geophone 62, such as a model GS14-L9 manufactured by Geospace Corporation of Houston, Tex., USA, is attached to the first end plate 12 to sense vibration occurring along axis 33 (FIG. 2) in the airframe structural member to which that end plate is attached. Alternatively, the airframe geophone 62 could be attached directly to the structural member. The geophone has a resonance close to 28 Hz and acts as a velocity sensor above that resonant frequency. The output signal from airframe geophone 62, representing the airframe structural vibration, is applied to an input of a first preamplifier and filter circuit 64 which extracts the signal at the excitation frequency of the geophone and converts the extracted signal into a square wave. This square wave signal FG1 produced by the first preamplifier and filter circuit 64 is applied to one input of a phase measure circuit 66.

A proof-mass geophone 68 is attached to the slider block 22 of the vibration absorber, as shown in FIG. 3, to sense the vibration of the absorber proof-mass 20 along axis 33. Alternatively, accelerometers could be used in place of the two geophones 62 and 68. The output signal from the proof-mass geophone 68 is fed to a second preamplifier and filter circuit 70 which extracts the signal at the excitation frequency of the proof-mass geophone 68 and converts the resultant signal into a square wave. The square wave signal FG2 from the second preamplifier and filter circuit 70 is applied to another input of the phase measure circuit 66. The second preamplifier and filter circuit 70 also contains a clock signal generator for the control circuit 60.

The phase measure circuit 66 determines the phase difference between the two filtered geophones signals FG1 and FG2. When the resonant frequency of the vibration absorber matches the frequency of vibrations in the airframe, the two geophone signals will be in quadrature, or ninety degrees out of phase. At that time, phase measure circuit 66 produces an output voltage level $V_{90}$ indicative of the quadrature relationship; for example, the $V_{90}$ level may equal one-half the supply voltage to the phase measure circuit. Because the phase measure circuit contains a RC network which integrates the phase relationship signal, the output signal may have a slight ripple due to the RC time constant. Variation of the two geophone signals from quadrature results in significant deviation of the phase measure circuit output voltage from the quadrature voltage level $V_{90}$ whereby the deviation magnitude indicates the magnitude of the non-quadrature phase difference and the direction of deviation indicates the direction of the phase shift between the two geophone signals.

The output from the phase measure circuit 66 is applied via line 74 to a control logic circuit 76. However, due to an RC network which integrates the phase relationship signal in the phase measure circuit, the output signal may have a slight ripple. To avoid false adjustment of the absorber's resonant frequency, control logic circuit 76 contains a window comparator which defines a voltage range, e.g. two volts, centered about the quadrature voltage level $V_{90}$. When the phase measure circuit's output voltage is inside this two volt range centered at the quadrature voltage level $V_{90}$, the control circuit 76 produces a true DISABLE signal, otherwise a false DISABLE signal is produced. As will be described, a true DISABLE signal inhibits operation of the motor assembly 32 and thus alteration of the spring stiffness for the vibration absorber. Therefore if a significant phase deviation of the geophone signals from quadrature occurs, the signal on line 74 will be outside the two volt range resulting in activation of the motor assembly 32.

The drive logic also produces a true DISABLE signal in response to a signal from an amplitude monitor 78 which receives the filtered airframe geophone signal FG1. The amplitude monitor output results in a true DISABLE signal when the signal from the airframe geophone 62 is too small to provide reliable tuning of the vibration absorber 10.

The control logic 76 also responds to the direction of the phase shift between the two geophone signals by producing a DIRECTION signal that indicates in which direction the motor 14 should be operated to tune the vibration absorber.

When the vibration absorber 10 is properly tuned to the frequency of vibrations within the airframe, the signals from the geophones 62 and 68 are in quadrature. This signal state causes the control circuit 60 to produce a true DISABLE signal which inhibits the motor driver 82 from operating the motor assembly 32. When the vibration absorber 10 is not properly tuned, the signals from the airframe and proof-mass geophones 62 and 68 will be out of quadrature. This condition results in the phase measure circuit output signal being outside the two volt range set by the Schmitt triggers in the drive logic 76. As a consequence, the drive logic 76 produces a false DISABLE signal which causes the motor driver 84 to produce a drive signal for the motor within the motor assembly 32. That drive signal causes the motor to move in the direction specified by the DIRECTION signal from the drive logic 76.

The motor assembly 32 turns the lead screw 40 which moves wrenches 46 and 47 and camshaft 38 to alter the spacing between the slider block 22 and the driver block 24. This movement of the two blocks 22 and 24 changes the tension on the flexible metal straps 26, 27, 30 and 31, thereby changing the stiffness of the spring in vibration absorber 10. This change in the spring stiffness alters the resonant frequency of the vibration absorber until it matches the frequency of vibration of the airframe structural member. When that match occurs, the signals from the two geophones 62 and 68 once again will be in quadrature causing the control circuit 60 to produce a true DISABLE signal thereby terminating operation of the motor within the motor assembly 32.

In this manner, the resonant frequency of the vibration absorber 10 can be changed to track variations in vibration frequencies which result from changes in the aircraft engine speed. In addition the system compensates for variation in resonant frequency which result from changes in temperature or material aging.

Figure 6:
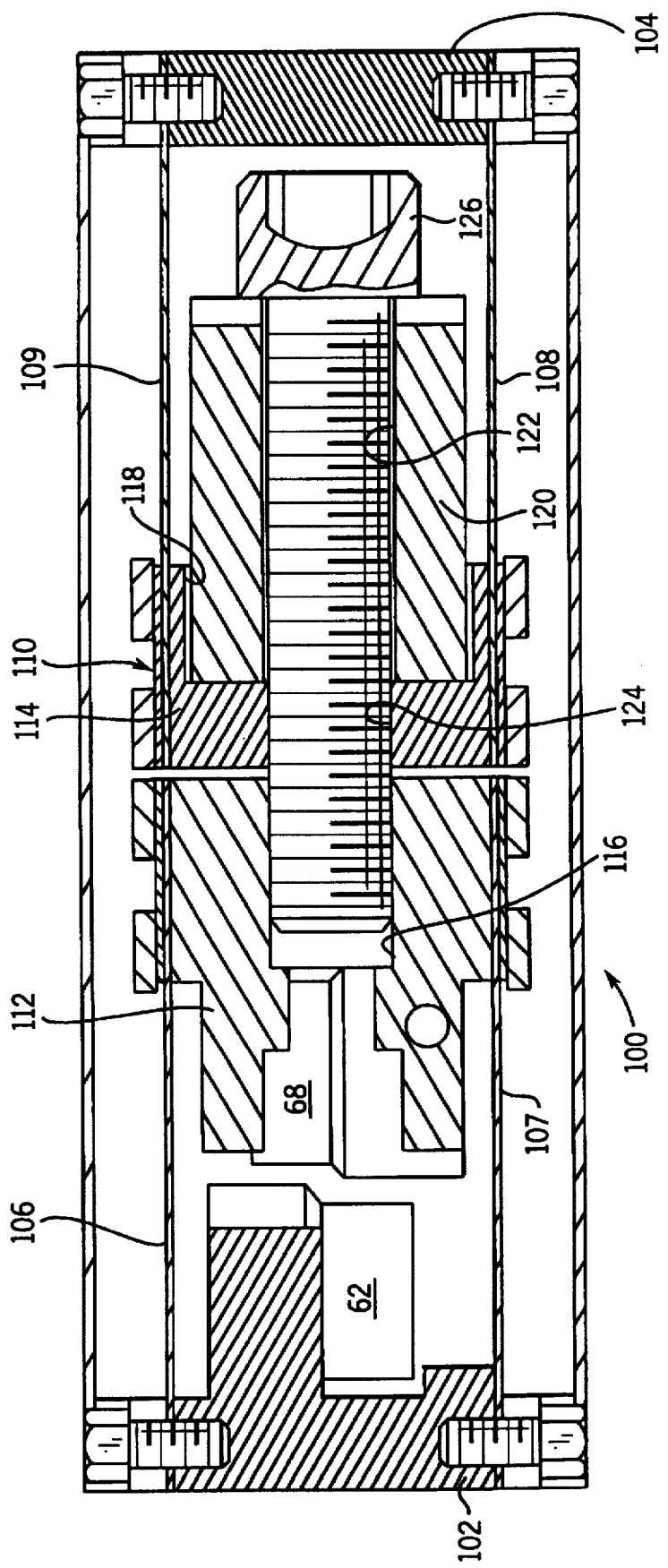
FIG. 6 is a horizontal, longitudinal cross-section through a second embodiment of a vibration absorber according to the present invention.

With reference to FIG. 6, another embodiment of a vibration absorber according to the present invention can be formed using a piezoelectric transducer in place of the motor assembly and camshaft mechanism. The vibration absorber 100 has two end plates 102 and 104 are connected by four flexible metal straps 106, 107, 108 and 109 to a proof-mass 110 comprising a slider block 112 and a driver block 114. The four metal straps 106–109 act as springs allowing transverse oscillation of the proof-mass between the two end plates. The slider block 112 includes a mounting for the proof-mass geophone 68 on one side, and has a threaded aperture 116 on the other side facing the second endplate 104.

The driver block 114 has a recess 118 in the surface that faces the second endplate 104. A piezoelectric transducer 120, formed by a stack of piezoelectric devices, is received within the recess 118. A bolt 126 extends through an aperture 122 in the piezoelectric transducer 120, through aperture 124 in the driver block 114 and is threaded into the aperture 116 in the slider block. The aperture 124 in the driver block 114 and the aperture 122 through the piezoelectric transducer 120 are larger in diameter than the outer diameter of the threads on bolt 126, so that the bolt threads do not engage those components. Instead, the head of the bolt 126 compresses the piezoelectric transducer against the driver block 114 and in turn pulls the driver block toward the slider block 112.

Depending upon the magnitude of the electrical excitation signal applied to the piezoelectric transducer 120, the transducer will expand in a direction along the longitudinal axis of the bolt 126. Such expansion has the effect of drawing the driver block 114 closer to the slider block 112 and thereby increasing tension on the metal straps 106–109. Thus, by varying the excitation signal for the piezoelectric transducer 120, the tension on the straps 106–109 is be varied in much the same manner in which the motor assembly 32 in the first embodiment varied the spring tension. As was described in detail with respect to the previous embodiment, variation of the tension of straps 104–109 alters the stiffness of the vibration absorber spring and thus the resonant frequency of the device. A control circuit receives the signals from the two geophones 62 and 68 in the embodiment of FIG. 6 and produces the appropriate excitation signal for the piezoelectric transducer 120 in order to adjust the resonant frequency of the vibration absorber to match vibrations in the structural member to which the absorber end plates 102 and 104 are attached.

Figure 7:
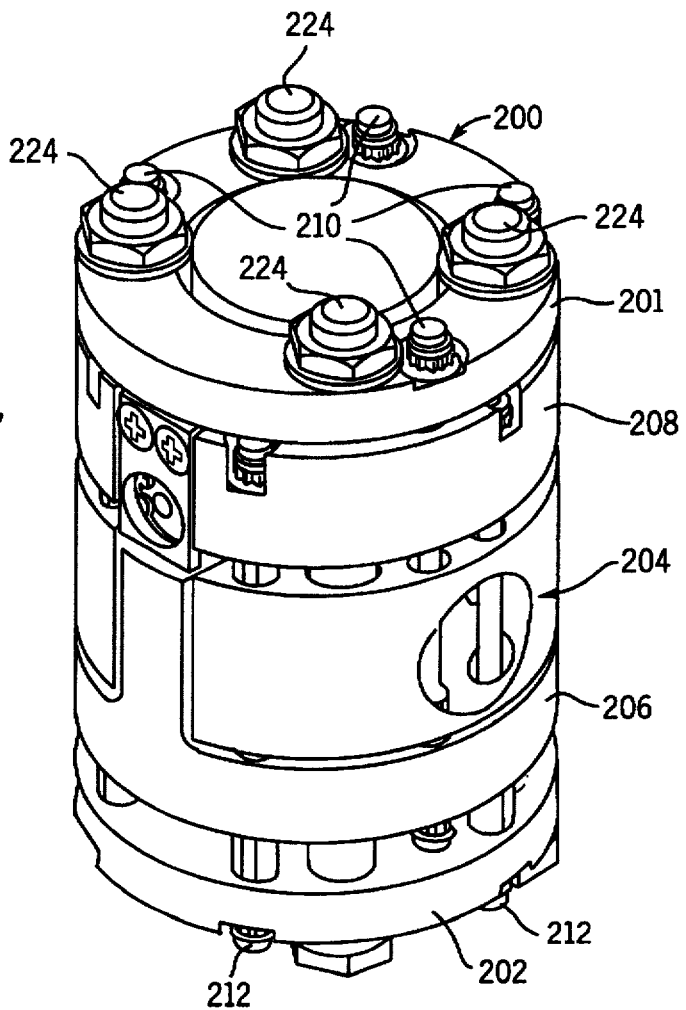
FIG. 7 is an isometric view of a device for absorbing vibrations along two orthogonal axes.
Figure 8:
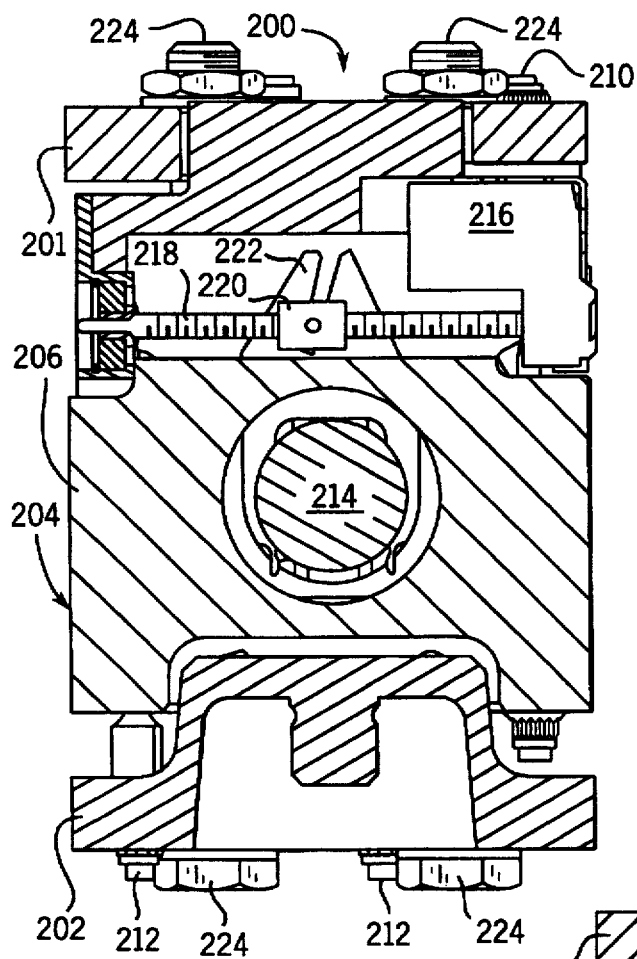
FIG. 8 is a cross section view taken along line 8—8 in FIG. 7.
Figure 9:
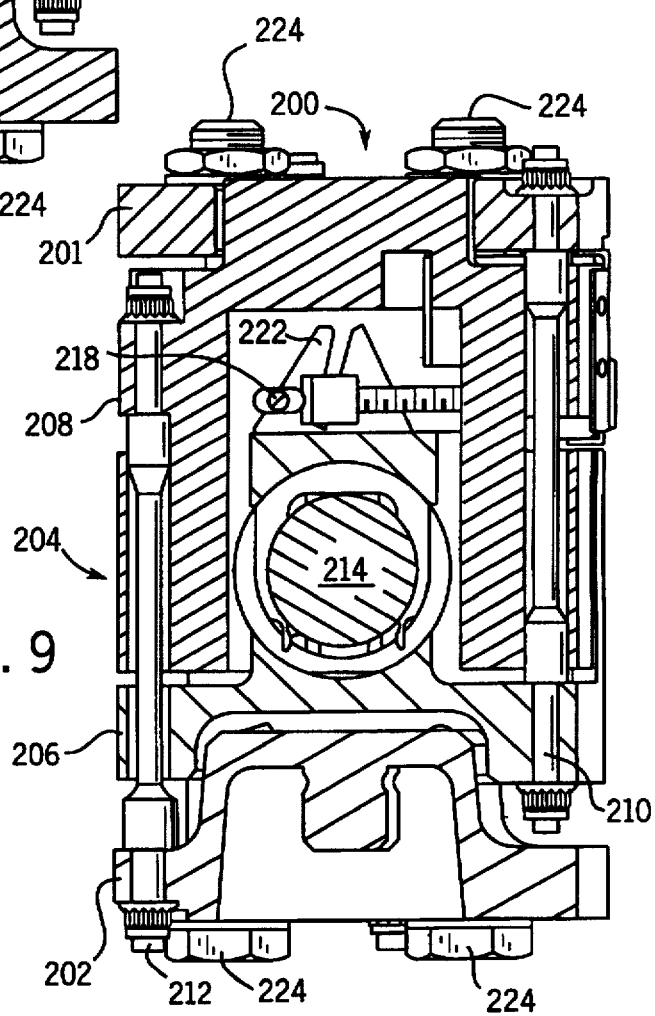
FIG. 9 is a cross section view taken along line 9—9 in FIG. 7.

Previously described embodiments of the present invention absorb vibration occurring along a single axis of flexure provided by the strap springs. FIGS. 7–9 illustrate an embodiment in which the vibration absorber 200 responds to vibrations occurring along two orthogonal axes that lie in a plane which is orthogonal to a line between two end plates. This embodiment does so by incorporating springs that are flexible along both those axes.

The vibration absorber 200 includes a pair of end plates 201 and 202 which act as a mount for attaching to the structural member in which the vibrations occur, such as an airframe member. A cylindrical proof-mass 204 is located between two end circular plates 201 and 202 and is formed by a slider block 206 and a driver block 208. The slider block 206 is coupled to the first end plate 201 by four circular cross section rods 210 which extend through, but do not engage, driver block 208. Similarly the driver block 208 is coupled to the second end plate 202 by four additional circular cross section rods 212 which extend through without engaging the slider block 206. The eight rods are arranged in a transverse circle through the proof-mass. The rods form flexible springs which allow the proof-mass to oscillate in two orthogonal axes lying in a plane that is perpendicular to a longitudinal axis between the two end plates 201 and 202.

The slider and driver blocks 206 and 208 are coupled together by a camshaft 214 in a manner similar to the coupling of slider and driver blocks 22 and 24 by camshaft 38 in vibration absorber 10 described previously. Specifically, driver block 208 supports a motor assembly 216 which includes a stepper motor driving a geared transmission. The output of the transmission is coupled to a threaded lead screw 218 extending across the driver block 208 and through a transfer block 220. A pair of wrenches 222 connect the transfer block 220 to camshaft 214. Motor assembly 216 receives a signal from control circuit 60, described previously, and responds by rotating the camshaft to alter the distance between the slider and driver blocks. This alteration of the block spacing changes compression of the rods 210 and 212 and thus the stiffness of the spring in vibration absorber 200. Four preload bolts 224 extend between the two end plates 201 and 202 and are tightened to apply compression which preloads the components between the end plates.

The foregoing description is directed to the preferred embodiments of the present invention. Although some attention was given to various alternatives within the scope of the invention, it is anticipated that skilled artisans will likely realize additional alternatives that are now apparent from the disclosure of those embodiments. For example, even though the vibration absorber is being described in the context of use in an aircraft, the invention has application in other types of structures that are subjected to vibration. Accordingly, the scope of the invention should be determined from the following claims and not limited by the above disclosure.

We claim:

1. A vibration absorber comprising:

a mounting member for attaching to a vibrating body;

a mass;

a spring comprising a pair of rigid members each having an axis and connected between the mounting member and the mass to permit said mass to vibrate with respect to said mounting member, and said spring having a stiffness which defines a resonant frequency at which said mass vibrates;

a first sensor which produces a signal indicating vibration of the body;

a mechanism which adjusts stiffness of said spring, in response to a control signal, by varying an axial force exerted upon the rigid members, thereby altering the resonant frequency; and a control circuit which receives the signal from said sensor and produces the control signal causing said mechanism to adjust the axial force exerted on the rigid members so that said spring and said mass resonate to absorb the vibration of the body.

2. The vibration absorber as recited in claim 1 wherein said first sensor is connected to said mounting member.

3. The vibration absorber as recited in claim 2 further comprising a second sensor attached to said mass and producing a second signal indicating vibration of said mass; and wherein said control circuit also produces the control signal in response to the second signal.

4. The vibration absorber as recited in claim 1 wherein each rigid member comprises a strap connected between the mounting member and the mass.

5. The vibration absorber as recited in claim 1 wherein said mechanism adjusts tension exerted on the rigid members.

6. The vibration absorber as recited in claim 1 wherein each rigid member comprises a rod connected between the mounting member and said mass.

7. The vibration absorber as recited in claim 1 wherein said mechanism adjusts compression exerted on the rigid members.

8. A vibration absorber comprising:

a first mounting member for attaching to a vibrating body;

a second mounting member for attaching to the vibrating body;

a mass having a first block and a second block;

a first spring connected between the first mounting member and the first block;

a second spring connected between the second mounting member and the second block;

a first sensor which produces a first signal indicating movement of the vibrating body;

a mechanism connected to the first and second blocks and responsive to a control signal by varying a distance between the first and second block to thereby alter stiffness of said first and second springs; and a control circuit which receives the first signal from said sensor and produces the control signal causing said mechanism to alter the stiffness of said spring so that said spring and said mass resonate to absorb the vibration of the body.

9. The vibration absorber as recited in claim 8 wherein said first spring comprises a first strap connected between the first mounting member and the first block; and said second spring comprises a second strap connected between the second mounting member and the second block.

10. The vibration absorber as recited in claim 9 wherein said mechanism by varying the distance between the first and second block alters an axial force exerted upon the first and second straps.

11. The vibration absorber as recited in claim 8 wherein said first spring comprises a first rod connected between the first mounting member and the first block; and said second spring comprises a second rod connected between the second mounting member and the second block.

12. The vibration absorber as recited in claim 11 wherein said mechanism by varying the distance between the first and second block alters an axial force exerted on the first and second rods.

13. The vibration absorber as recited in claim 8 wherein said mechanism comprises:

a camshaft having a first section coupled to the first block and a second section concentric with the first section and coupled to the second block; and a motor which rotates said camshaft in response to the control signal.

14. The vibration absorber as recited in claim 13 further comprising a wrench coupled to said motor and having a jaw which grasps the camshaft.

15. The vibration absorber as recited in claim 8 wherein said mechanism by varying the distance between the first and second block adjusts tension of said first and second springs.

16. The vibration absorber as recited in claim 8 wherein said first spring comprises a first strap connected between the first mounting member and one side of the first block, and a second strap connected between the first mounting member and another side of the first block; and said second spring comprises a third strap connected between the second mounting member and one side of the second block, and a fourth strap connected between the second mounting member and another side of the second block.

17. The vibration absorber as recited in claim 8 wherein said mechanism by varying the distance between the first and second block adjusts compression of said first and second springs.

18. The vibration absorber as recited in claim 8 wherein said first spring comprises a first plurality of rods connected between the first mounting member and the first block; and wherein said second spring comprises a second plurality of rods connected between the second mounting member and the second block.

19. The vibration absorber as recited in claim 8 wherein said mechanism comprises piezoelectric material.

* * * * *